(12) United States Patent
Rossaert

(10) Patent No.: US 7,936,261 B2
(45) Date of Patent: May 3, 2011

(54) SYSTEM AND METHOD FOR TESTING A MACHINE USING AN INTERACTIVE TEST SCRIPT

(75) Inventor: Paul Rossaert, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 391 days.

(21) Appl. No.: 12/286,018

(22) Filed: Sep. 26, 2008

(65) Prior Publication Data

US 2010/0079301 A1    Apr. 1, 2010

(51) Int. Cl.
G08B 29/00 (2006.01)
G08B 21/00 (2006.01)
G06F 7/70 (2006.01)

(52) U.S. Cl. ......... 340/514; 340/679; 340/684; 701/29; 701/50; 434/29

(58) Field of Classification Search .................. 340/514, 340/679
See application file for complete search history.

(56) References Cited

U.S. PATENT DOCUMENTS

| | | | |
|---|---|---|---|
| 4,267,569 A | 5/1981 | Baumann et al. | |
| 4,385,518 A | 5/1983 | Rickett | |
| 4,390,953 A | 6/1983 | Johnstone | |
| 5,313,388 A | 5/1994 | Cortis | |
| 5,712,782 A | 1/1998 | Weigelt et al. | |
| 5,908,454 A | 6/1999 | Zyburt et al. | |
| 5,916,287 A | 6/1999 | Arjomand et al. | |
| 6,285,925 B1 | 9/2001 | Steffen | |
| 6,366,821 B1 * | 4/2002 | Carew et al. | 700/17 |
| 6,512,968 B1 * | 1/2003 | de Bellefeuille et al. | 701/33 |
| 6,567,709 B1 | 5/2003 | Malm et al. | |
| 6,609,051 B2 | 8/2003 | Fiechter et al. | |
| 6,928,358 B2 * | 8/2005 | Brooks et al. | 701/99 |
| 7,191,040 B2 | 3/2007 | Pajakowski et al. | |
| 2003/0001750 A1 * | 1/2003 | Ishimoto et al. | 340/691.6 |
| 2007/0100519 A1 | 5/2007 | Engel | |
| 2008/0082228 A1 | 4/2008 | Massen et al. | |

* cited by examiner

*Primary Examiner* — Donnie L Crosland
(74) *Attorney, Agent, or Firm* — Liell & McNeil

(57) ABSTRACT

A method of testing a machine includes a step of establishing a communication link between a test system and a control system of the machine. An interactive test script is executed on the test system, and includes a communication of a first operator initiated machine task to an operator. After performance of the first operator initiated machine task is confirmed, the test system monitors for a predetermined condition. Once the predetermined condition is detected, a machine test is performed. A second operator initiated machine task is communicated after the machine test is performed.

20 Claims, 9 Drawing Sheets

| Machine Test — 192 | Machine Operating Parameters Measured — 194 | Predetermined Conditions Monitored — 196 |
|---|---|---|
| Service Brakes — 198 | Rear Brake Pressure | Throttle Percentage<br>Transmission/Gear Code<br>Park Brake Code<br>Torque Converter Temperature<br>Transmission Temperature |
| Transmission Calibration — 200 | Initiate calibration procedure | Torque Converter Temperature<br>Transmission Temperature |
| Implement Drift — 202 | Lift linkage position<br>Tilt linkage position | Lift linkage position<br>Tilt linkage position<br>Implement lever<br>Ride control<br>Hydraulic Oil Temperature |
| Left Pedal — 204 | Left pedal position<br>Rear brake pressure | Transmission neutralization |
| Transmission Shifting — 206 | Max ground speed for each gear in manual and automatic modes | Throttle Percentage<br>Transmission/Gear Code |

Figure 9

SYSTEM AND METHOD FOR TESTING A MACHINE USING AN INTERACTIVE TEST SCRIPT

TECHNICAL FIELD

The present disclosure relates generally to a system and method for testing a machine, and more particularly to executing an interactive test script on a test system that is in communication with a control system of the machine.

BACKGROUND

During manufacture of large machines, such as, for example, on-highway or off-highway machines, several tests may be performed throughout the assembly process. For example, tests, including electrical or mechanical tests, may be conducted to identify and correct any defects occurring within any of the various sub-assemblies, prior to integration with other components or assemblies. After assembly, additional and, oftentimes, final tests are performed to ensure the quality and performance of the machine before it is provided to a customer. Such post-assembly tests may include a road test, which may be carried out on the road or in the field in order to test various aspects of the machine during normal operation. During a typical road test, an operator may perform one or more machine tests, such as according to a written script, and record a pass or a fail for each test. It should be appreciated, however, that various inconsistencies may inherently occur with human operation and testing.

U.S. Pat. No. 4,385,518 discloses a test system for simulating a road test of an automotive vehicle while measuring data relevant to performance of an engine and transmission of the automotive vehicle. Specifically, the test system includes an anchor for holding the automobile stationary, while a roller is engaged with a traction wheel of the automobile and is coupled to a hydraulic pump-motor. A hydraulic loop, interconnecting the hydraulic pump-motor and a reservoir, includes a flow control valve for controlling flow resistance within the hydraulic loop. As such, a typical load imposed on the engine and transmission, during normal operation, may be simulated. While the road test simulator may provide more consistent engine and transmission testing across a fleet of vehicles under ideal operating conditions, it does not offer the more accurate means of testing a vehicle provided by an actual road test. Further, the cited reference does not discuss means for testing various other aspects of the vehicle that are typically tested during a road test.

The present disclosure is directed to one or more of the problems set forth above.

SUMMARY OF THE DISCLOSURE

In one aspect, a method of testing a machine includes a step of establishing a communication link between a test system and a control system of the machine. An interactive test script is executed on the test system, and includes a communication of a first operator initiated machine task to an operator. After performance of the first operator initiated machine task is confirmed, the test system monitors for a predetermined condition. Once the predetermined condition is detected, a machine test is performed. A second operator initiated machine task is communicated after the machine test is performed.

In another aspect, a system for testing a machine includes a test system in communication with a control system of the machine. An interactive test is executed on the test system and includes a communication of a first operator initiated machine task to an operator. After performance of the first operator initiated machine task is confirmed, the test system monitors for a predetermined condition. Once the predetermined condition is detected, a machine test is performed. Thereafter, the test system communicates a second operator initiated machine task to the operator.

BRIEF DESCRIPTION OF THE DRAWINGS

FIG. 9 is an exemplary table that relates machine tests performed by the test system of FIG. 3, as per the interactive test script, to one or more predetermined conditions monitored by the test system, according to the present disclosure.

DETAILED DESCRIPTION

Figure 1:
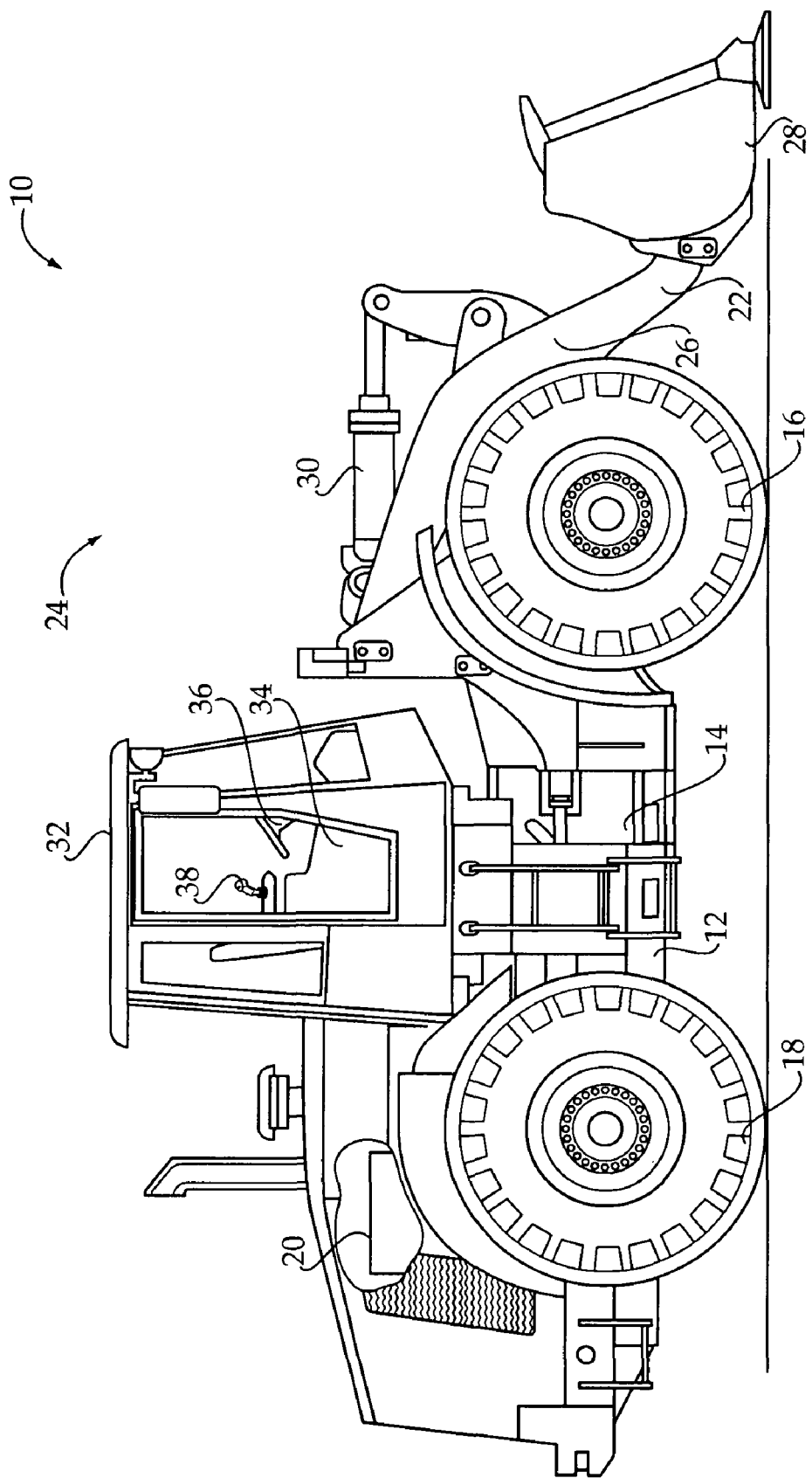
FIG. 1 is a side diagrammatic view of a machine, according to the present disclosure.

An exemplary embodiment of a machine 10 is shown generally in FIG. 1. The machine 10 may be a wheel loader, as shown, or any other on-highway or off-highway vehicle used to perform work operations. In the illustrated embodiment, machine 10 includes a machine body 12, or chassis, having a drive system 14 supported thereon for driving wheels of the machine 10, such as, for example, front wheels 16 or rear wheels 18. Drive systems, also known as drivetrains or powertrains, typically receive power from an internal combustion engine 20, or other power source, and transmit that power to one or more ground engaging elements, such as the front wheels 16 or rear wheels 18, using any known means. According to a specific example, the drive system 14 may include a transmission, torque converter, final drive assembly, and/or any other known components. It should be appreciated, however, that a variety of drive systems are contemplated for propelling the machine 10.

The internal combustion engine 20 may also provide power for one or more implements, such as, for example, a loader 22, attached to the machine body 12 at a front end 24 of the machine 10. The loader 22 may include a pair of arms 26 movably attached to the front end 24 of the machine body 12. The pair of arms 26 may be moved upward and downward in order to lift and lower a bucket 28. The bucket 28, useful in supporting a payload material, may be movably attached to the pair of arms 26, and may be tilted about a horizontal axis. As is known in the art, one or more hydraulic cylinders 30 may be positioned to control movement of each aspect of the loader 22, such as, for example, moving the pair of arms 26 and tilting the bucket 28. As such, the internal combustion engine 20 may provide power to a hydraulic system that supplies pressurized hydraulic fluid to the one or more hydraulic cylinders 30.

An operator control station 32 may be mounted to the machine body 12 and may include standard devices, such as, for example, a seat assembly 34 and a steering device 36 that facilitate operator control. The operator control station 32 may include various other devices, including, but not limited to, one or more machine operation controllers. For example, a machine operation controller may be provided for controlling movement of one or more implements, such as the loader 22, of the machine 10. In addition, a machine operation controller may be provided for controlling a direction of movement of the machine 10, such as a forward, neutral, or reverse direction. The operator control station 32 may also include an operator engine speed selection device 38, such as, for example, a throttle, for selecting an engine speed of the internal combustion engine 20.

Figure 2:
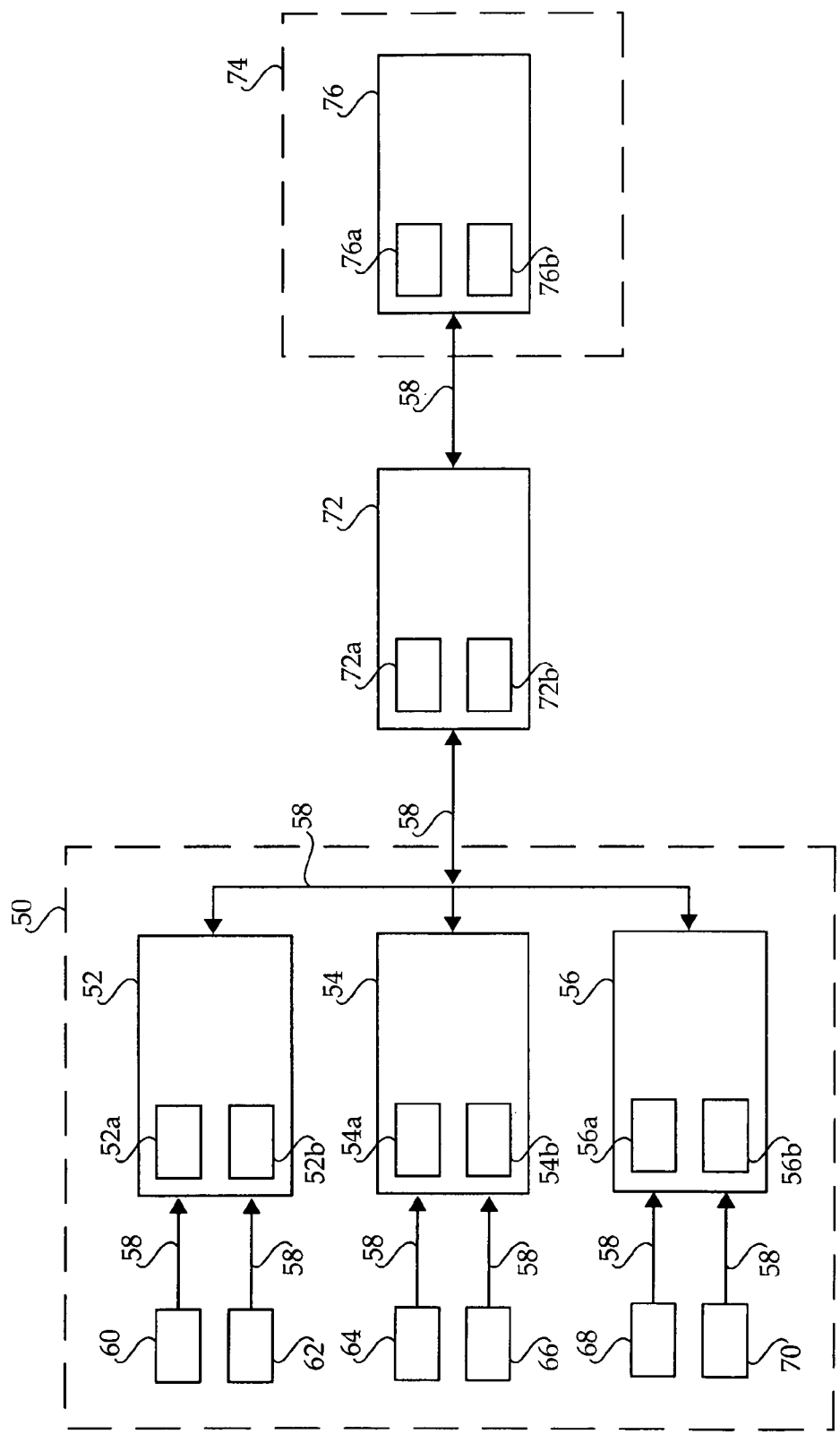
FIG. 2 is a block diagram of a test system in communication with an exemplary control system for a machine, such as the machine of FIG. 1, according to the present disclosure.

Turning now to FIG. 2, an exemplary control system for controlling the machine 10 is shown generally at 50. Specifically, the control system 50 may include one or more electronic controllers for controlling one or more of the various systems of machine 10. For example, the control system 50 may include an engine electronic controller 52 for controlling the internal combustion engine 20, a drive system electronic controller 54 for controlling one or more components of the drive system 14, and an implement, or hydraulic, electronic controller 56 for controlling the loader 22. Although three electronic controllers 52, 54, and 56 are shown, it should be appreciated that the control system 50 may include any number of electronic controllers for controlling any of various operational aspects of machine 10. Further, the control system 50 may include a master electronic controller (not shown) for controlling and/or coordinating operation of each of the other electronic controllers 52, 54, and 56. Alternatively, one of the engine electronic controller 52, drive system electronic controller 54, and implement electronic controller 56 may be designated master electronic controller.

Each of the electronic controllers 52, 54, and 56 may be of standard design and may include a processor, such as, for example, a central processing unit, a memory, and an input/output circuit that facilitates communication internal and external to the electronic controller 52. According to the illustrated embodiment, for example, electronic controllers 52, 54, and 56 may include processors 52*a*, 54*a*, and 56*a*, respectively, and memories 52*b*, 54*b*, and 56*b*, respectively. The processors 52*a*, 54*a*, and 56*a* may control operation of the electronic controllers 52, 54, and 56 by executing operating instructions, such as, for example, computer readable program code stored in memories 52*b*, 54*b*, and 56*b*, wherein operations may be initiated internally or externally to the electronic controllers 52, 54, and 56. A control scheme may be utilized that monitors outputs of systems or devices, such as, for example, sensors, actuators, or control units, via the input/output circuit to control inputs to various other systems or devices.

The memories 52*b*, 54*b*, and 56*b* may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. Such devices may be located internally or externally to the electronic controllers 52, 54, and 56. One skilled in the art will appreciate that any computer based system or device utilizing similar components for controlling the machine systems or components described herein, is suitable for use with the present disclosure.

Each of the electronic controllers 52, 54, and 56 may communicate via one or more wired and/or wireless communications lines 58, or other similar input/output circuits. Further, each electronic controller 52, 54, and 56 may communicate with one or more sensors, or similar devices, associated with the specific machine system controlled by the electronic controller 52, 54, and 56. For example, an engine speed sensor 60 may be configured to communicate with the engine electronic controller 52, via communications line 58, to provide an indication to the engine electronic controller 52 of the current speed of the internal combustion engine 20. In addition, a temperature sensor 62 may be configured to sense a temperature of engine coolant used for cooling the internal combustion engine 20. It should be appreciated, however, that the engine electronic controller 52 may communicate with a variety of sensors or devices, as necessary to control the internal combustion engine 20, or engine system in general.

One or more sensors, such as, for example, a drive system torque sensor 64, may produce a signal over communications line 58 indicative of the rotational speed or temperature of a torque converter of the drive system 14. According to one embodiment, this rotational speed may be used to determine the ground speed of the machine 10. Alternatively, however, it should be appreciated that various other sensors, such as, for example, a transmission output sensor or ground speed sensor, may be used for measuring the ground speed of the machine 10. In addition, the drive system electronic controller 54 may be in communication with a transmission fluid temperature sensor 66. The drive system electronic controller 54 may monitor the drive system torque sensor 64, the transmission fluid temperature sensor 66, and/or other sensors, to identify various operational aspects of the drive system 14. As such, it should be appreciated that the drive system electronic controller 54 may be in communication with a variety of sensors, including, for example, pressure, speed, or temperature sensors, to properly evaluate and control operation of the drive system 14.

The loader 22, or the hydraulic system therefor, may also include one or more sensors, such as a pressure sensor 68, configured to produce signals over one or more communications lines 58 that are indicative of the pressure and/or flow of hydraulic fluid provided to the loader 22. Specifically, the sensor 68, and any additional sensors, may monitor the pressure and/or flow of hydraulic fluid that is provided to one or more hydraulic cylinders 30. As such, the implement electronic controller 56 may be configured to identify various operational aspects of the loader 22 by monitoring sensor 68. One or more position sensors, such as position sensor 70, may be provided for determining a position of one or more components of the loader 22. It should be appreciated that the implement electronic controller 56 may communicate with a number of sensors and/or devices to sufficiently operate and control the loader 22, and/or the hydraulic system therefor.

A test system, shown generally at 72, may be in communication, such as over a communication link, with the control system 50 of the machine 10. The test system 72 may include a processor 72*a*, such as, for example, a central processing unit, a memory 72*b*, and an input/output circuit that facilitates communication internal and external to the test system 72. The processor 72*a* may control operation of the test system 72 by executing operating instructions, such as, for example, computer readable program code stored in memory 72*b*, wherein operations may be initiated internally or externally to the test system 72. The memory 72*b* may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices.

The test system 72 may also be in communication, such as over a communication link, with a manufacturing, or assembly, facility 74, such as a manufacturing facility at which all or a portion of the machine 10 described herein is assembled. As should be appreciated, the manufacturing facility 74 may include a server 76, which may also include a processor 76a and a memory 76b, similar to the respective components described above. The server 76 may constitute all or a part of a general control system for the manufacturing facility 74 and, as such, may include one or more devices in communication over a network. According to the exemplary embodiment, the server 76 may store electronic records, such as machine data records, including data relevant to each machine, such as machine 10, manufactured therein. Such machine data records may, for example, include configuration and testing data relevant to a referenced machine.

Figure 3:
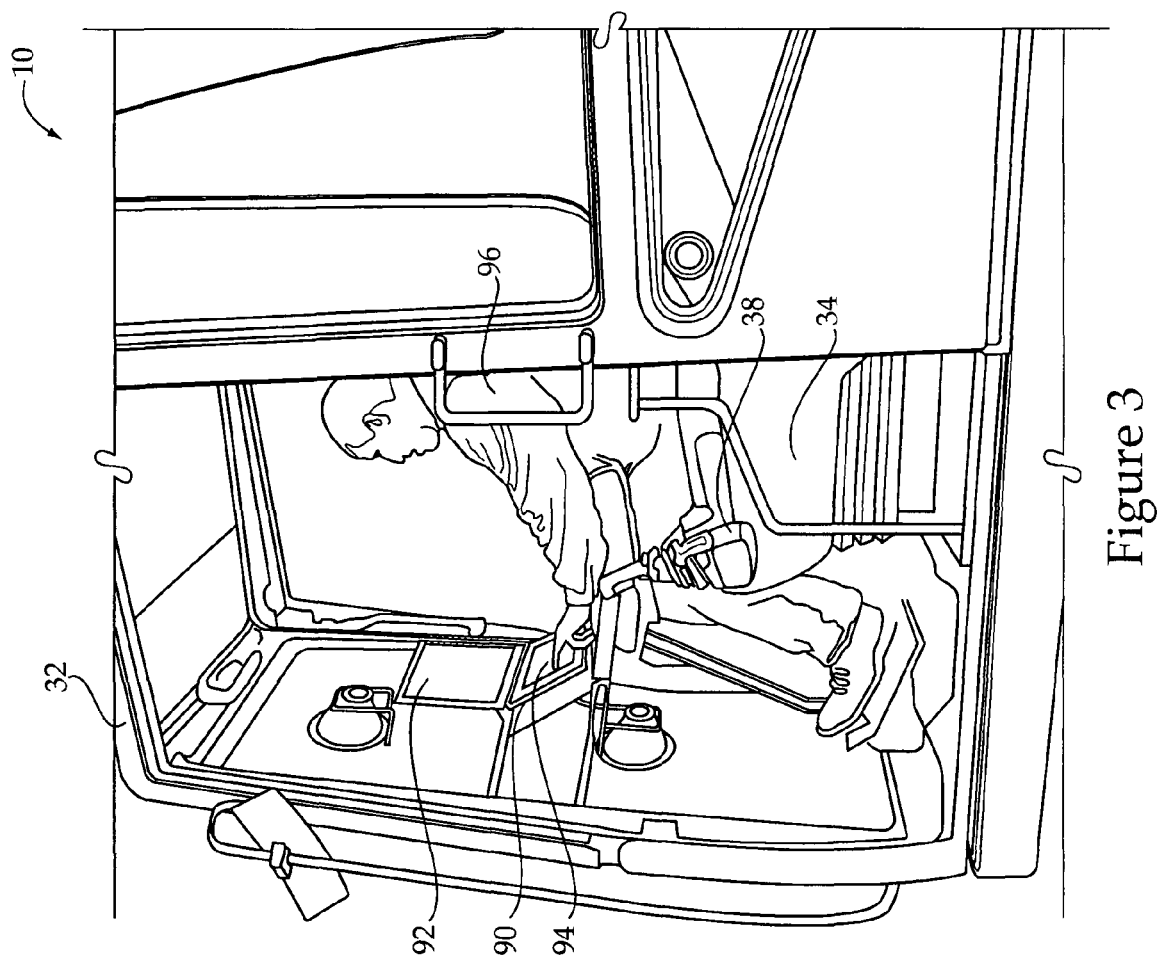
FIG. 3 is a perspective view of an exemplary embodiment of the test system of FIG. 2 supported within an operator control station of the machine of FIG. 1, according to the present disclosure.

Turning now to FIG. 3, an exemplary embodiment of the test system 72 of FIG. 2 may include a laptop 90, or other portable test system. As shown, the laptop 90 may generally include a display 92 and an operator interface 94, such as a keyboard, facilitating input from an operator 96 of the machine 10. Laptops, such as laptop 90, are well known and may include the processor 72a and memory 72b described above. Further, the laptop 90, or other specific embodiment of the test system 72, may be configured to execute an interactive test script, described below in greater detail, thereon. For convenience, the laptop 90 may be semi-permanently mounted within the machine 10. By semi-permanently mounted, it is meant that the laptop 90 may be mounted within the machine 10 in a manner that is sufficiently rugged to withstand normal operation of the machine 10, such as during a testing period, and still remain operational. However, the laptop 90 may be removed without significantly degrading the structural integrity of the selected mounting structure of the machine 10. According to the exemplary embodiment, the laptop 90 may be mounted within, or supported by, the operator control station 32 of the machine 10.

Figure 4:
FIG. 4 is an exemplary screenshot from a display of the test system of FIG. 3 during execution of an interactive test script thereon, according to the present disclosure.

The interactive test script, introduced above, may be executed on the laptop 90, or other test system 72, during a test, such as a road test, of the machine 10. During execution of the interactive test script, a first screen 110, as represented in an exemplary screenshot shown in FIG. 4, may be displayed on the display 92 of the laptop 90 (FIG. 3). The first screen 110 may include one or more standard sections, such as, for example, a title section 112, an information section 114, and a menu section 116. The title section 112 may display a title of the interactive test script, along with information pertaining to the current screen being viewed. The information section 114 may be provided for displaying various informational data, including, for example, a current date/time and identification data pertaining to the specific machine being tested. The menu section 116 may include one or more available menu options of the interactive test script. For example, the menu section 116 may include links to various screens of the interactive test script, facilitating appropriate navigation thereof. Although exemplary sections are shown, it should be appreciated that specific implementations of the interactive test script may include a variety of graphical user interfaces representing various information, as desired.

The first screen 110 may also include a machine data section 118, as shown. The machine data section 118 may display data from the machine data record described above. According to a specific example, a machine data record corresponding to the machine 10 may be retrieved from the server 76 of the manufacturing facility 74 (FIG. 2), such as by entering a machine serial number corresponding to machine 10. As such, specific information relating to the configuration and/or testing of the machine 10 may be acquired. According to a further example, the interactive test script may be customized based on a configuration of the machine 10, as indicated by the machine data record. For example, the interactive test script may be automatically customized to test only the specific components, or options, of machine 10. As a result, portions of the interactive test script configured to test options that are not provided with machine 10 may be removed, or otherwise rendered inactive.

Figure 5:
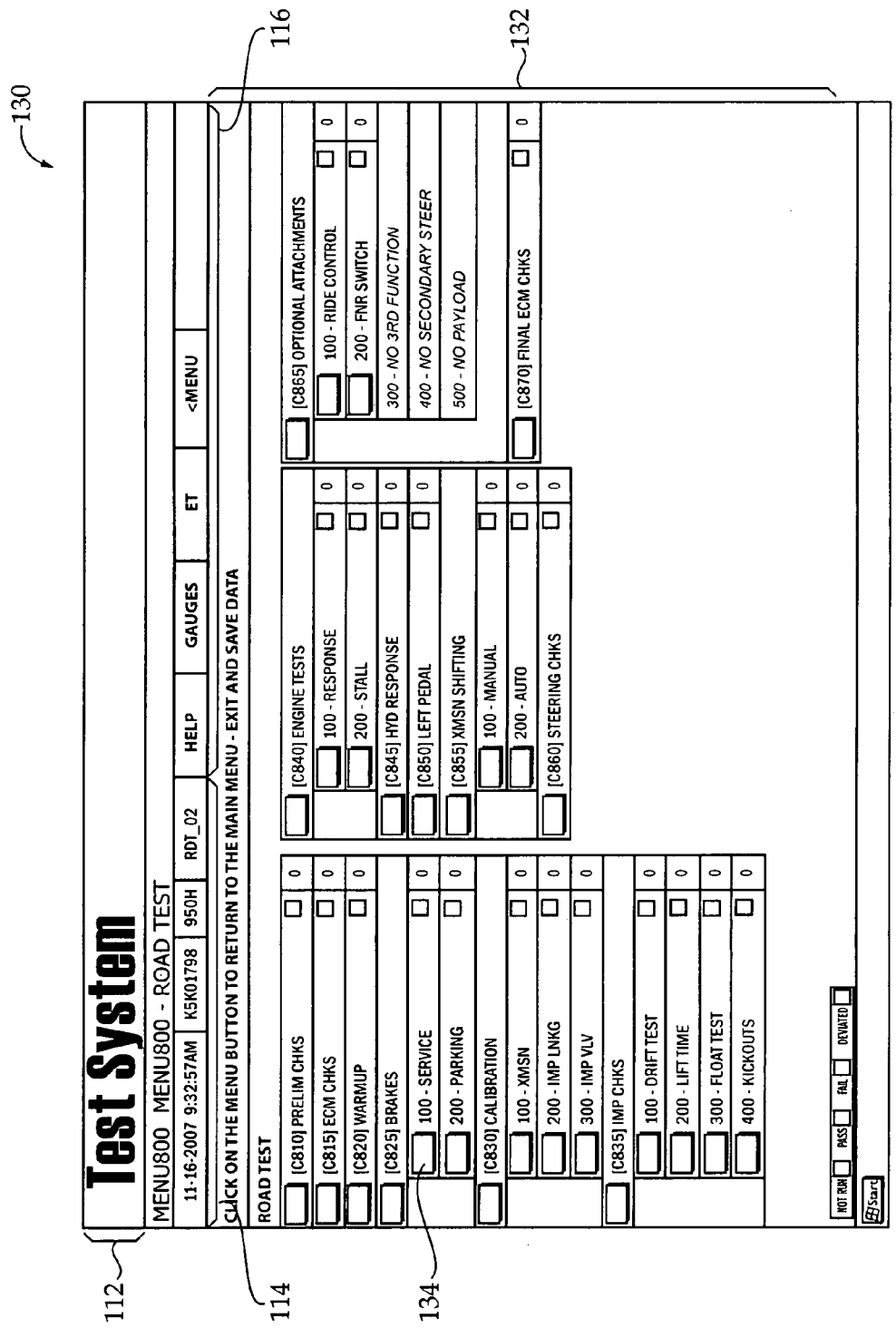
FIG. 5 is an additional exemplary screenshot from the display of the test system shown in FIG. 3, according to the present disclosure.

After machine data has been entered, or retrieved, a menu or overview of the tests to be performed on machine 10 during execution of the interactive test script may be displayed on the display 92 (FIG. 3), as represented by a second exemplary screenshot 130 in FIG. 5. It should be appreciated that the machine components and/or features listed in a test overview section 132 of the second screen 130 are provided as examples only and, therefore, should not be unnecessarily limiting. The tests, and/or procedures, provided in the test overview section 132, according to the exemplary embodiment, may represent tests performed as part of a road test of the machine 10. Specifically, the tests performed on machine 10 may be performed after assembly of the machine 10, and before delivery or sale to a customer. However, the tests may be performed at any time during the operational life of the machine 10, as desired.

The tests, or procedures, of the interactive test script may be performed in sequence, such as automatically, or may be performed by manually selecting a desired test. For example, the tests may be performed according to a predetermined order after a first test, or procedure, in the sequence is initiated. Alternatively, or additionally, each of the tests may be performed by individually selecting a desired test. Such an option, as should be appreciated, may be desirable to allow a test or procedure to be repeated. According to a specific example, a test of the service brakes of the machine 10 may be performed by selecting the service brakes test from the test overview section 132, such as by actuating a selection feature or button 134 corresponding to the service brakes test. Alternatively, the service brakes test may be automatically initiated after one or more preceding tests or procedures, such as preliminary checks, electronic controller checks, and a warm-up, have been performed.

Figure 6:
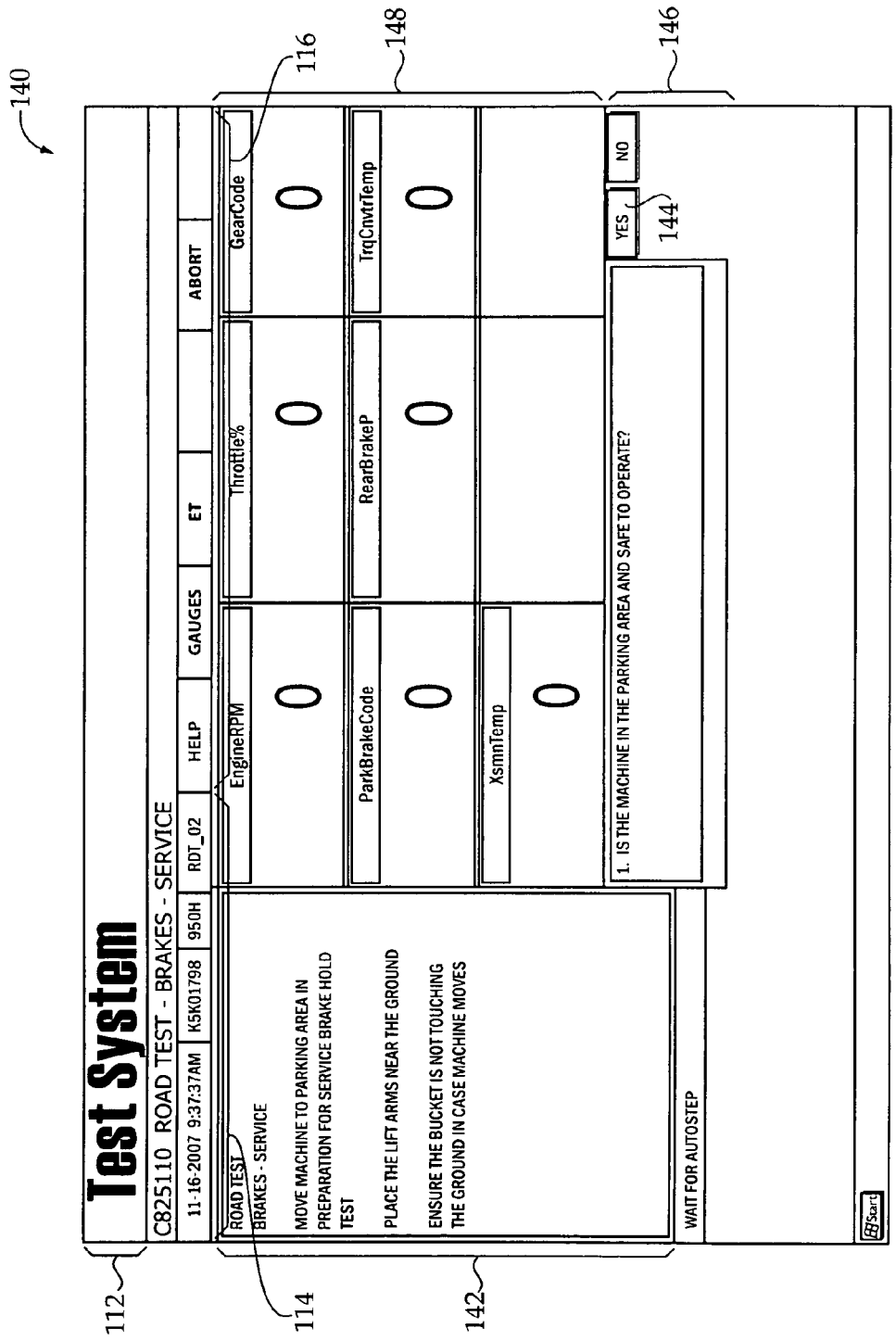
FIG. 6 is yet another exemplary screenshot from the display of FIG. 3, according to the present disclosure.

A first window in a set of windows corresponding to the services brakes test may be displayed on the display 92 (FIG. 3), as shown in a third exemplary screenshot 140 of FIG. 6. The third screen 140 may include, along with standard sections 112, 114, and 116, an instructions section 142 for communicating one or more operator initiated machine tasks, or instructions, of the service brakes test to the operator 96 (FIG. 3). The operator initiated machine tasks may represent requests for the operator 96 to set an operating state or condition of the machine 10, such as by actuating one or more of the machine operation controllers within the operator control station 32. For example, the instructions section 142 may direct the operator 96 to "move machine to parking area in preparation for service brake hold test," "place the lift arms near the ground," and "ensure the bucket is not touching the ground in case the machine moves." Such instructions may be displayed on the display 92 of the laptop 90 of FIG. 3, or may be communicated to the operator 96 using any other known communication means, including visual and/or auditory queues.

Depending on the instructions indicated, the operator 96 may be requested to confirm performance of the one or more operator initiated machine tasks, such as by using the operator interface 94. For example, the operator 96 may select a yes button 144, shown in a confirmation section 146, after performance of the operator initiated machine tasks listed in the instructions section 142 of FIG. 6. Specifically, once the operator 96 has moved the machine 10 to a parking area and has moved the lift arms 26 and bucket 28 into a safe position, the operator 96 may actuate the yes button 144 to proceed with the service brakes test. As shown, an operating parameters section 148 may also be provided for displaying values corresponding to one or more machine operating parameters, as detected by the control system 50 and communicated to the test system 72. For example, it may be desirable to monitor engine speed, such as by using engine speed sensor 60, throttle percentage, transmission or gear code, parking brake code, torque converter temperature, using drive system torque sensor 64, transmission temperature, using temperature sensor 66, and rear brake pressure. Although specific examples are given, it should be appreciated that a variety of machine operating parameters may be monitored during the service brakes test, or other machine tests, of the interactive test script.

Figure 7:
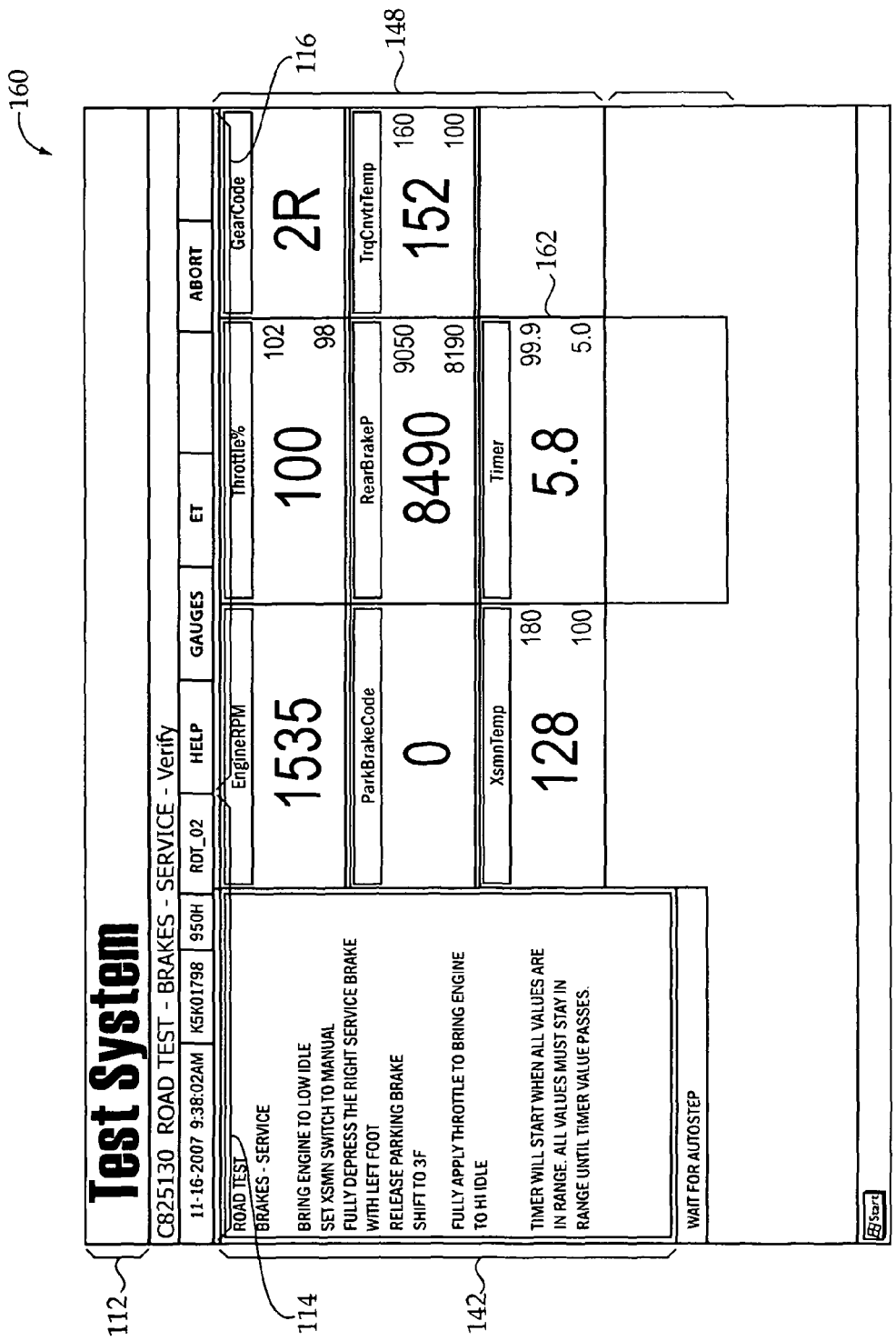
FIG. 7 is yet another exemplary screenshot from the display of FIG. 3, according to the present disclosure.

After the machine 10 has been moved to the parking area and is safe to operate, as indicated by the operator 96, the instructions section 142, as shown in a fourth screenshot 160 of FIG. 7, may display additional operator initiated machine tasks or instructions. For example, the operator 96 of FIG. 3, may next be required to "bring engine to low idle," "set XSMN switch to manual," "fully depress the right service brake with the left foot," "release parking brake," "shift to 3F," and "fully apply throttle to bring engine to high idle." As is also indicated in the instructions section 142, a "timer will start when all values are in range. All values must stay in range until timer value passes." Specifically, such a timer, represented graphically at 162, may be configured to measure elapsed time, such as by using a system clock of the laptop 90, or other test system 72, once one or more predetermined conditions are met.

As indicated, the service brakes test may require that one or more machine operating parameters remain within predetermined ranges for a predetermined period of time. Specifically, the test system 72, in communication with the control system 50 of the machine 10 may request values, such as sensor output values, corresponding to monitored machine operating parameters, as shown in the operating parameters section 148. Once it is indicated that certain values, such as, for example, throttle percentage, gear code, park brake code, torque converter temperature, and transmission temperature, are within required ranges or have desired values, the timer, depicted at 162, begins. If the values remain within the predetermined ranges for the requisite time, such as, for example, five seconds, a pass of the service brakes test may be indicated. Otherwise, a fail of the service brakes test may be indicated.

Figure 8:
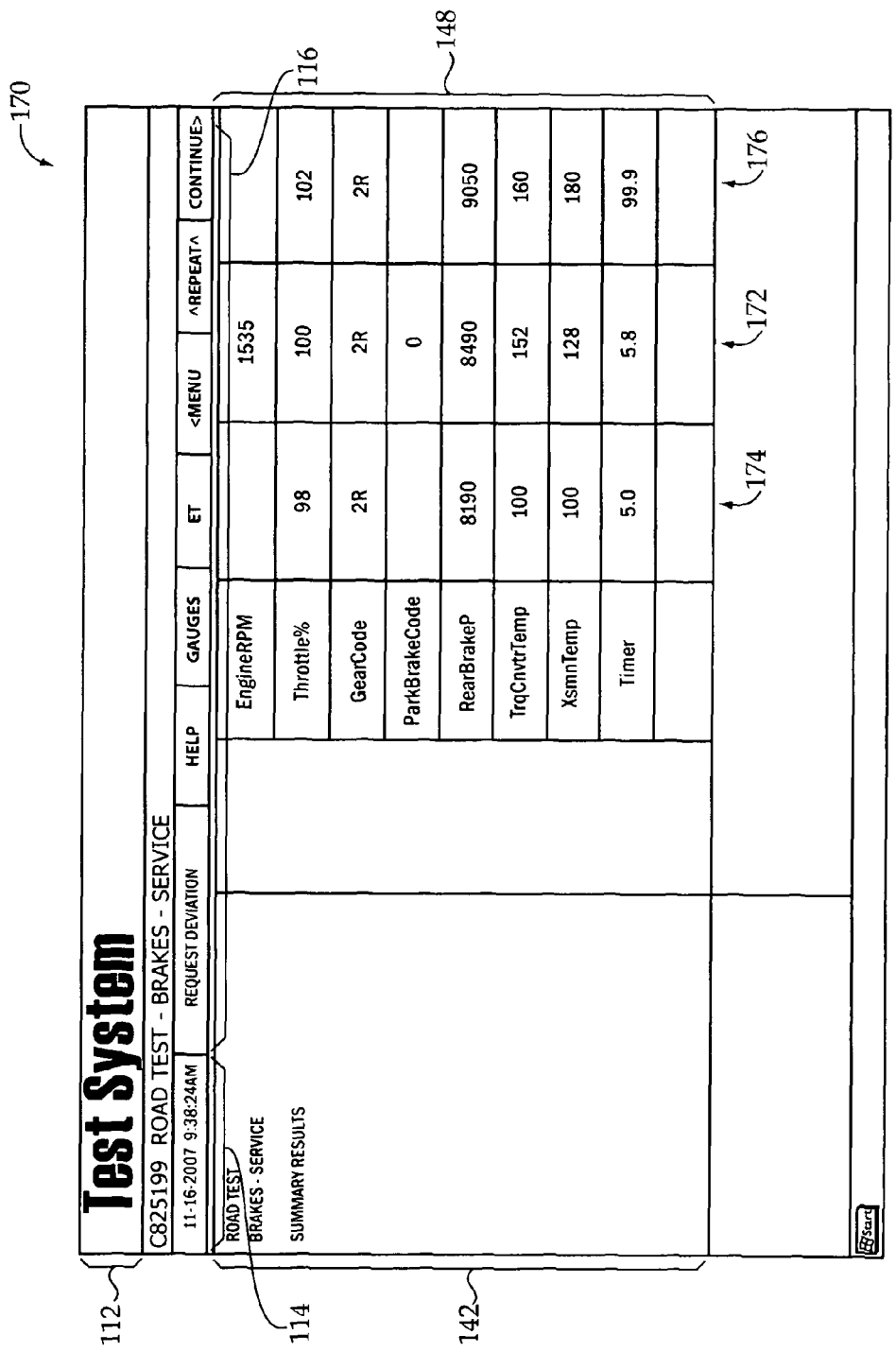
FIG. 8 is yet another exemplary screenshot from the display of FIG. 3, according to the present disclosure.

After the required period of time has lapsed, a summary of the service brakes test may be provided, similar to the summary shown in a fifth screenshot 170 of FIG. 8. Specifically, a measured value for each of the machine operating parameters may be displayed at column 172, between a lowest acceptable value and a highest acceptable value of a range of expected values, represented at columns 174 and 176, respectively. In addition, the pass or fail of the service brakes test, as described above, may be communicated to the operator 96 (FIG. 3). Various means are contemplated for informing the operator 96 of the pass or fail of the service brakes test, or other machine test, such as by using visual and/or auditory queues. In addition, an indication of the pass or fail of the service brakes test, and other machine tests, may be stored with the machine data record corresponding to the machine 10, along with the specific values acquired during the test. According to a preferred embodiment, the machine data record stored on the server 76 of the manufacturing facility 74 (FIG. 2) may be updated with the results of each machine test.

It should be appreciated that the interactive test script described herein may require an operator, such as operator 96, to perform one or more operator initiated machine tasks and then confirm performance of the required tasks. For example, the interactive test script may request that the operator 96 indicate such performance using the operator interface 94 of the laptop 90, or other test system 72. Alternatively, the interactive test script may automatically confirm performance of the operator initiated machine tasks by measuring a value of one or more machine operating parameters that may be indicative of such performance. Thereafter, the interactive test script may monitor for certain predetermined conditions to be met, before performing or initiating a machine test, or procedure. The machine tests, as should be appreciated, may include measuring a value of one or more machine operating parameters once the predetermined conditions have been satisfied. Once a pass or fail determination is made, the interactive test script may initiate performance of another machine test, until all of the machine tests have been performed.

Turning now to FIG. 9, a table 190 relating exemplary machine tests to predetermined conditions is shown. Specifically, table 190 includes a machine test column 192 listing exemplary tests that may be performed on machine 10 using the interactive test script described herein. Machine operating parameters that may be measured during performance of each machine test to indicate a pass or fail of the test are listed in an operating parameters column 194, and predetermined conditions that may be required for performance of each test are listed in a predetermined conditions column 196. As shown in row 198, and described above with reference to FIGS. 4-8, a service brakes test may measure rear brake pressure and compare the measured value to an expected range of values to determine a pass or fail of the service brakes test. However, as indicated in the predetermined conditions column 196, the interactive test script may require specific values for throttle percentage, gear code, park brake code, torque converter temperature, and transmission temperature before the measurement is taken. According to a specific example, the interactive test script may require detection of a full throttle, a gear code of 2R, a park brake code of 0, and specific temperature ranges for the torque converter and transmission before performing the service brakes test. Further, the interactive test script may require such values be maintained for a predetermined period of time, such as, for example, five seconds.

Referring to row 200, a transmission calibration procedure may also be initiated during execution of the interactive test script. Successful initiation or performance of the calibration may indicate a pass, while an unsuccessful initiation may indicate a fail. As shown in the predetermined conditions column 196, the interactive test script may require specific values, or temperature ranges, for the torque converter and the transmission, prior to initiation of the calibration procedure. It should be appreciated that the calibration procedure may include an electronically controlled program that may be internal or external to the control system 72. As such, the calibration procedure is only peripherally within the scope of the present disclosure and will not be discussed herein in greater detail.

An implement drift test, as shown in row 202, may measure lift linkage position and tilt linkage position, such as by using position sensor 70, and compare the measured values to expected values to determine a pass or a fail of the implement drift test. Such a pass or fail may be stored with a machine data record referencing the machine 10. The test, as indicated in column 196 may require initial lift and tilt linkage positions, limited or no movement of an implement lever, deactivation of a ride control feature (if installed), and a specific temperature or temperature range of the hydraulic oil prior to performance of the implement drift test. Further, the test system 72, or interactive test script, may require such values be maintained for a predetermined period of time, such as, for example, five minutes.

At row 204, a left pedal test may include a measurement of left pedal position and rear brake pressure, such as to confirm a previously performed calibration. A pass may be indicated if the left pedal position and the rear brake pressure are within desired ranges; otherwise, a fail may be indicated. The test results, as determined by the test system 72, may ultimately be stored with a machine data record for the machine 10. According to the interactive test script, the measurements of left pedal position and rear brake pressure may be taken at the point of transmission neutralization from forward to reverse, as indicated in the predetermined conditions column 196. As should be appreciated, the test system 72 may acquire such measurements during communication with the control system 50 of the machine 10. As such, the test system 72 may not be equipped with sensors, or other measurement devices, or be required to perform any measurements, if so desired.

Finally, at row 206, a transmission shifting test may measure the maximum ground speed for all forward and reverse gears of the machine 10 in both manual mode and automatic mode, as indicated in column 194. Successful measurements, according to the predetermined conditions listed in column 196 may indicate a pass, while unsuccessful measurements may indicate a fail. The predetermined conditions of the transmission shifting test, or procedure, may include a full throttle and correct gear and direction for a predetermined period of time, such as, for example, ten seconds. Maximum ground speed, which may be determined using torque converter speed sensor 64, may be recorded and stored with the machine data record, described above.

It should be appreciated that the specific machine tests, including relevant operating parameters and predetermined conditions, described herein are provided as examples only. Any machine test or procedure, requiring performance according to consistent and defined processes, may be performed using the computer controlled, interactive test script described herein. As a result, tests may be performed and measured values may be recorded only when predetermined conditions are met, as determined by the test system 72. Such a computer controlled, scripted road test may reduce inconsistencies that may inherently occur with human operation, by limiting operator control to performing operator initiated machine tasks, such as those described herein.

INDUSTRIAL APPLICABILITY

The present disclosure may find potential application in any on-highway or off-highway machine. Further, the present disclosure may be applicable to machines that have recently been assembled and require testing prior to delivery to a customer. Yet further, the present disclosure may apply to machines requiring tests performed according to consistent and defined standards. Such machines may include, but are not limited to, off-highway machines, such as wheel loaders or excavators, on-highway machines, such as buses and trucks, and other machines known in the art.

Referring generally to FIGS. 1-9, a machine 10 may include a machine body 12 having a drive system 14 supported thereon for driving wheels of the machine 10, such as, for example, front wheels 16 or rear wheels 18. Drive system 14 may receive power from an internal combustion engine 20, and may transmit that power to one or more ground engaging elements, such as the front wheels 16 or rear wheels 18, using any known means. The internal combustion engine 20 may also provide power for an implement, such as a loader 22, attached to the machine body 12 at a front end 24 of the machine 10. A control system 50 for controlling the machine 10 may include one or more electronic controllers, such as an engine electronic controller 52, a drive system electronic controller 54, and an implement, or hydraulic, electronic controller 56, each of which may be in communication with various sensors.

After assembly of the machine 10, a test system 72 may be used to test various aspects of the machine 10. Specifically, the test system 72, which may include a laptop 90, may be positioned within an operator control station 32 of the machine 10 and may communicate with the control system 50. An interactive test script, described herein, may be executed on the test system 72 and may include various machine tests and/or procedures for testing the machine 10. For example, one or more operator initiated machine tasks may be communicated to an operator 96 of the machine 10, such as by using a display 92 of the laptop 90. Once performance of the operator initiated machine tasks are confirmed, such as by the operator provided an indication using an operator interface 94 of the laptop 90, one or more predetermined conditions may be monitored. Monitoring for a predetermined condition, as described above, may include monitoring for a predetermined lapse of time or monitoring for one or more machine operating parameters to reach a predetermined threshold. For example, it may be desirable to perform a test or request a measurement when certain other operating parameters are within a desired range.

Once the predetermined condition is detected, the machine test or procedure may be performed. For example, the machine test may include determining a value associated with a machine operating parameter. As a result of the machine test, a pass or a fail of the machine test may be stored with a machine data record corresponding to the machine 10. Additional tests may be performed automatically, according to a predetermined sequence, or manually by selecting a specific machine test. In addition, deviations may be requested and/or tests may be repeated, depending on a specific configuration of the interactive test script. As should be appreciated, operator control may be limited to initiation of the tests and/or performance of the operator initiated machine tasks. As a result, the interactive test script of the present disclosure may provide a computer controlled means for performing post-assembly tests, such as road tests, according to consistent and defined standards.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method for testing a machine, comprising:
  establishing a communication link between a test system and a control system of the machine; and executing an interactive test script on the test system, wherein the executing step includes: communicating a first operator initiated machine task to an operator; confirming performance of the first operator initiated machine task; monitoring for a predetermined condition after the confirming step; performing a machine test after the predetermined condition is detected by the control system; and communicating a second operator initiated machine task to the operator after the machine test is performed.

2. The method of claim 1, further including establishing a communication link between the test system and a server of a manufacturing facility.

3. The method of claim 2, further including:
retrieving a machine data record corresponding to the machine from the server of the manufacturing facility; and
customizing the interactive test script based on a configuration of the machine indicated by the machine data record.

4. The method of claim 1, wherein each of the step of communicating the first operator initiated machine task and the step of communicating the second operator initiated machine task includes displaying at least one operator instruction on a display of the test system.

5. The method of claim 4, wherein the confirming step includes indicating performance of the at least one operator instruction using an operator interface of the test system.

6. The method of claim 5, wherein the monitoring step includes monitoring for a predetermined lapse of time.

7. The method of claim 5, wherein the monitoring step includes monitoring for a machine operating parameter to reach a predetermined threshold.

8. The method of claim 5, wherein the performing step includes determining a value associated with a machine operating parameter.

9. The method of claim 8, further including determining a pass or a fail of the machine test by comparing the value to an expected range of values.

10. The method of claim 9, further including storing an indication of the pass or the fail of the machine test with a machine data record corresponding to the machine.

11. A system for testing a machine, comprising:
a test system in communication with a control system of the machine and configured to execute an interactive test script thereon; and
wherein the test system is further configured to communicate a first operator initiated machine task to an operator; confirm performance of the first operator initiated machine task; monitor for a predetermined condition after confirming performance of the first operator initiated machine task; perform a machine test after the predetermined condition is detected; and communicate a second operator initiated machine task to the operator after the machine test is performed.

12. The system of claim 11, wherein the test system is further in communication with a server of a manufacturing facility.

13. The system of claim 12, wherein the test system is further configured to retrieve a machine data record corresponding to the machine from the server of the manufacturing facility, and customize the interactive test script based on a configuration of the machine indicated by the machine data record.

14. The system of claim 11, wherein the test system is further configured to display at least one operator instruction associated with at least one of the first operator initiated machine task and the second operator initiated machine task on a display of the test system.

15. The system of claim 14, wherein the test system if further configured to receive an indication of performance of the at least one operator instruction using an operator interface of the test system.

16. The system of claim 15, wherein the test system includes a timer, wherein the predetermined condition includes a predetermined lapse of time as indicated by the timer.

17. The system of claim 15, wherein the test system is further configured to monitor a value associated with a machine operating parameter, wherein the predetermined condition includes the value reaching a predetermined threshold.

18. The system of claim 15, wherein the machine test includes an acquisition of a value associated with a machine operating parameter.

19. The system of claim 18, wherein the test system is further configured to determine a pass or a fail of the machine test by comparing the value to an expected range of values.

20. The system of claim 19, wherein an indication of the pass or the fail of the machine test is stored with a machine data record corresponding to the machine.

* * * * *